United States Patent
Lai

(10) Patent No.: US 10,142,238 B2
(45) Date of Patent: Nov. 27, 2018

(54) DYNAMIC NETWORK LOAD REGULATING DEVICE AND METHOD THEREFOR

(71) Applicant: NANNING FUGUI PRECISION INDUSTRIAL CO. LTD., Nanning (CN)

(72) Inventor: Yi-Ting Lai, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 73 days.

(21) Appl. No.: 15/252,235

(22) Filed: Aug. 31, 2016

(65) Prior Publication Data

US 2017/0346739 A1    Nov. 30, 2017

(30) Foreign Application Priority Data

May 31, 2016   (TW) .............................. 105117099 A

(51) Int. Cl.
*H04L 12/803* (2013.01)
*H04L 12/26* (2006.01)

(52) U.S. Cl.
CPC ........ *H04L 47/125* (2013.01); *H04L 43/0882* (2013.01); *H04L 43/16* (2013.01)

(58) Field of Classification Search
None
See application file for complete search history.

(56) References Cited

U.S. PATENT DOCUMENTS

| 6,219,739 | B1  | 4/2001  | Dutt et al. |             |
|-----------|-----|---------|-------------|-------------|
| 7,606,203 | B1* | 10/2009 | Shabtay     | H04L 1/08   |
|           |     |         |             | 370/252     |
| 2006/0101159 | A1* | 5/2006 | Yeh      | H04L 45/00  |
|           |     |         |             | 709/246     |
| 2007/0002738 | A1  | 1/2007 | McGee    |             |
| 2010/0097926 | A1* | 4/2010 | Huang    | G06F 11/2005|
|           |     |         |             | 370/219     |
| 2010/0278054 | A1* | 11/2010| Dighe    | H04L 43/00  |
|           |     |         |             | 370/252     |
| 2012/0243442 | A1* | 9/2012 | Musku    | H04L 12/4625|
|           |     |         |             | 370/256     |
| 2014/0254604 | A1* | 9/2014 | Janardhanan | H04L 45/18 |
|           |     |         |             | 370/401     |
| 2017/0046293 | A1* | 2/2017 | Lasater  | G06F 13/4022|

FOREIGN PATENT DOCUMENTS

TW    201218693 A    5/2012

* cited by examiner

*Primary Examiner* — Diane Lo
(74) *Attorney, Agent, or Firm* — ScienBiziP, P.C.

(57) ABSTRACT

A dynamic network load regulating device includes a first network bridge, a second network bridge, a third network bridge, and a traffic monitoring module. The second network bridge and the third network bridge are further coupled to a plurality of terminal devices. Each of the network bridges includes a plurality of ports. The traffic monitoring module is configured to monitor the plurality of ports traffic load. When a first data transmission path traffic load reaches a congestion threshold, the dynamic network load regulating device increases the first data transmission path cost to select a second data transmission path to transmit network data. A method for the dynamic network load regulating device is also provided.

14 Claims, 2 Drawing Sheets

US 10,142,238 B2

DYNAMIC NETWORK LOAD REGULATING DEVICE AND METHOD THEREFOR

FIELD

The subject matter herein generally relates to regulation of network loadings and method.

BACKGROUND

Rapid spanning tree protocol (RSTP) is an evolution of the 802.1D standard. In the 802.1D standard, a significantly faster spanning tree convergence is needed when a data network topology is changed.

BRIEF DESCRIPTION OF THE DRAWINGS

Implementations of the present technology will now be described, by way of example only, with reference to the attached figures.

DETAILED DESCRIPTION

Figure 1:
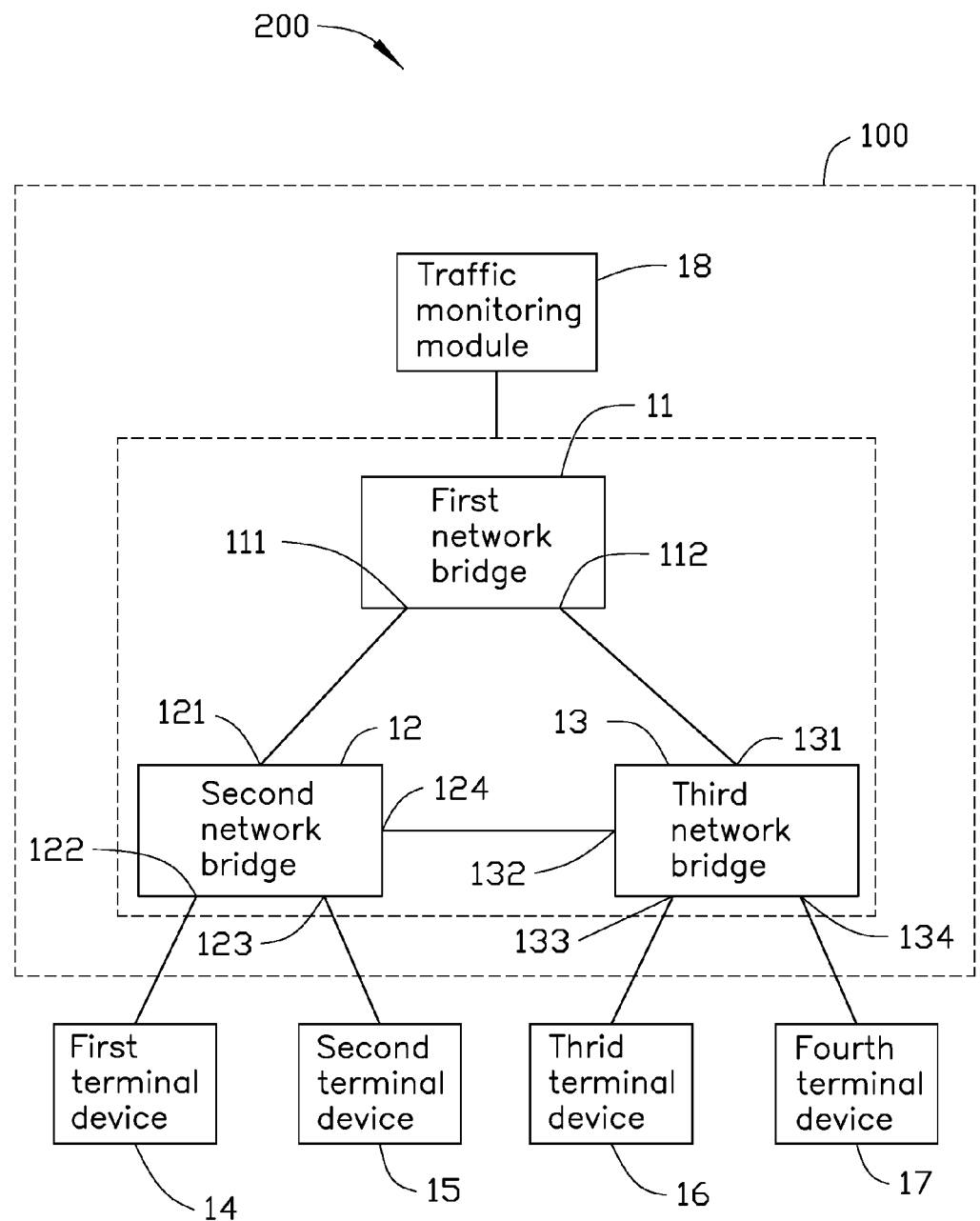
FIG. 1 is a step diagram of an embodiment of a dynamical network load regulating device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to a device dynamically regulating a network load and applicable method.

FIG. 1 illustrates an embodiment of a dynamical network load regulating device 100.

The dynamic network load regulating device 100 comprises a first network bridge 11, a second network bridge 12, and a third network bridge 13.

The first network bridge 11 is coupled to a first terminal device 14 and a second terminal device 15 via the second network bridge 12. The first network bridge 11 is further coupled to a third terminal device 16 and a fourth terminal device 17 via the third network bridge 13.

In one embodiment, when the second network bridge 12 and the third network bridge 13 are coupled to a plurality of terminal devices, then the first network bridge 11, the second network bridge 12, the third network bridge 13, and the plurality of terminal devices form a data network 200.

The first network bridge 11 is a root bridge. The first network bridge 11 comprises a first port 111 and a second port 112.

The second network bridge 12 comprises a third port 121, a fourth port 122, a fifth port 123, and a sixth port 124. The third port 121 is coupled to the first port 111. The fourth port 122 is coupled to the first terminal device 14. The fifth port 123 is coupled to the second terminal device 15.

The third network bridge 13 comprises a seventh port 131, a eighth port 132, a ninth port 133, and a tenth port 134. The seventh port 131 is coupled to the second port 112. The eighth port 132 is coupled to the sixth port 124. The ninth port 133 is coupled to the third terminal device 16. The tenth port 134 is coupled to the fourth terminal device 17.

In one embodiment, the data network 200 is a distributed data network.

When the first terminal device 14, the second terminal device 15, the third terminal device 16, and the fourth terminal device 17 are coupled to the data network 200, the data network 200 allocates bandwidth between the first terminal device 14, the second terminal device 15, the third terminal device 16, and the fourth terminal device 17 according to their respective types.

In one embodiment, the third port 121 and the seventh port 131 are root ports. The fourth port 122, the fifth port 123, the ninth port 133, and the tenth port 134 are edge ports.

In one embodiment, each terminal devices has a committed information rate (CIR) and a peak information rate (PIR), the CIR and PIR are determined by the terminal devices type, the root port rate, and the other edge ports rates.

In one embodiment, the root port rate can be 10 Gbit/s, a CIR of the first terminal device 14 can be 2 Gbit/s, a PIR of the first terminal device 14 can be 4 Gbit/s, a CIR of the second terminal device 15 can be 8 Gbit/s, a PIR of the second terminal device 15 can be 9.6 Gbit/s, a CIR of the third terminal device 16 can be 1 Gbit/s, a PIR of the third terminal device 16 can be 2 Gbit/s, a CIR of the fourth terminal device 17 can be 1 Gbit/s, and a PIR of the fourth terminal device 17 can be 2 Gbit/s.

In the data network 200 topology, the first terminal device 14 is coupled to the first port 111 via the fourth port 122 and the third port 121 in that order. The connection path between the first terminal device 14, the fourth port 122, the third port 121, and the first port 111 is defined as a first data transmission path.

The second terminal device 15 is coupled to the first port 111 via the fifth port 123 and the third port 121 in that order. The connection path between the second terminal device 15, the fifth port 123, the third port 121, and the first port 111 is defined as a second data transmission path.

The third terminal device 16 is coupled to the first port 111 via the ninth port 133, the eighth port 132, the sixth port 124, and the third port 121 in that order. The connection path between the third terminal device 16, the ninth port 133, the eighth port 132, the sixth port 124, the third port 121, and the first port 111 is defined as a third data transmission path.

The fourth terminal device 17 is coupled to the first port 111 via the tenth port 134, the eighth port 132, the sixth port 124, and the third port 121 in that order. The connection path between the fourth terminal device 17, the tenth port 134, the eighth port 132, the sixth port 124, the third port 121, and the first port 111 is defined as a fourth data transmission path.

A quality of service (QOS) mechanism is applied to the data network 200.

In one embodiment, the data network 200 further comprises a traffic monitoring module 18. The sixth port 124 is a designated port. The traffic monitoring module 18 is configured to monitor the root port and the designated port traffic load. The traffic monitoring module 18 can be a ternary content addressable memory (TCAM).

Each of the first data transmission path, the second data transmission path, the third data transmission path, and the fourth data transmission path have a path cost. The path cost is in inverse relation with the bandwidth.

The traffic monitoring module 18 counts and meters the traffic load via a two rate three color marker (TrTCM) algorithm. The TrTCM algorithm marks state of traffic load via three colors. Green is defined as traffic load in a normal state, yellow is defined as traffic load in a exceeding state, and red is defined as traffic load in a congested state. The TrTCM algorithm comprises two token buckets.

When the first data transmission path is determined as red, the traffic load of the first data transmission path is congested, and the dynamic network load regulating device 100 adjusts the first data transmission path cost to achieve load balance.

Fox example, a bandwidth of the third port 121 is 10 Gbit/s, a path cost between the third port 121 and the first port 111 is 2000. A path cost between the sixth port 124 and the eighth port 132 is 5000. A path cost between the seventh port 131 and the second port 112 is 10000.

When the first data transmission path is determined as red, the dynamic network load regulating device 100 changes the path cost between the third port 121 and the first port 111 to 6000. Thereby, a lowest path cost from the third terminal 16 to the first network bridge 11 is changed, and a lowest path cost from the fourth terminal 17 to the first network bridge 11 is also changed. A connection path between the third terminal device 16, the ninth port 133, the seventh port 131, and the second port 112 is defined as the third data transmission path. A connection path between the fourth terminal device 17, the tenth port 134, the seventh port 131, and the second port 112 is defined as the fourth data transmission path.

Figure 2:
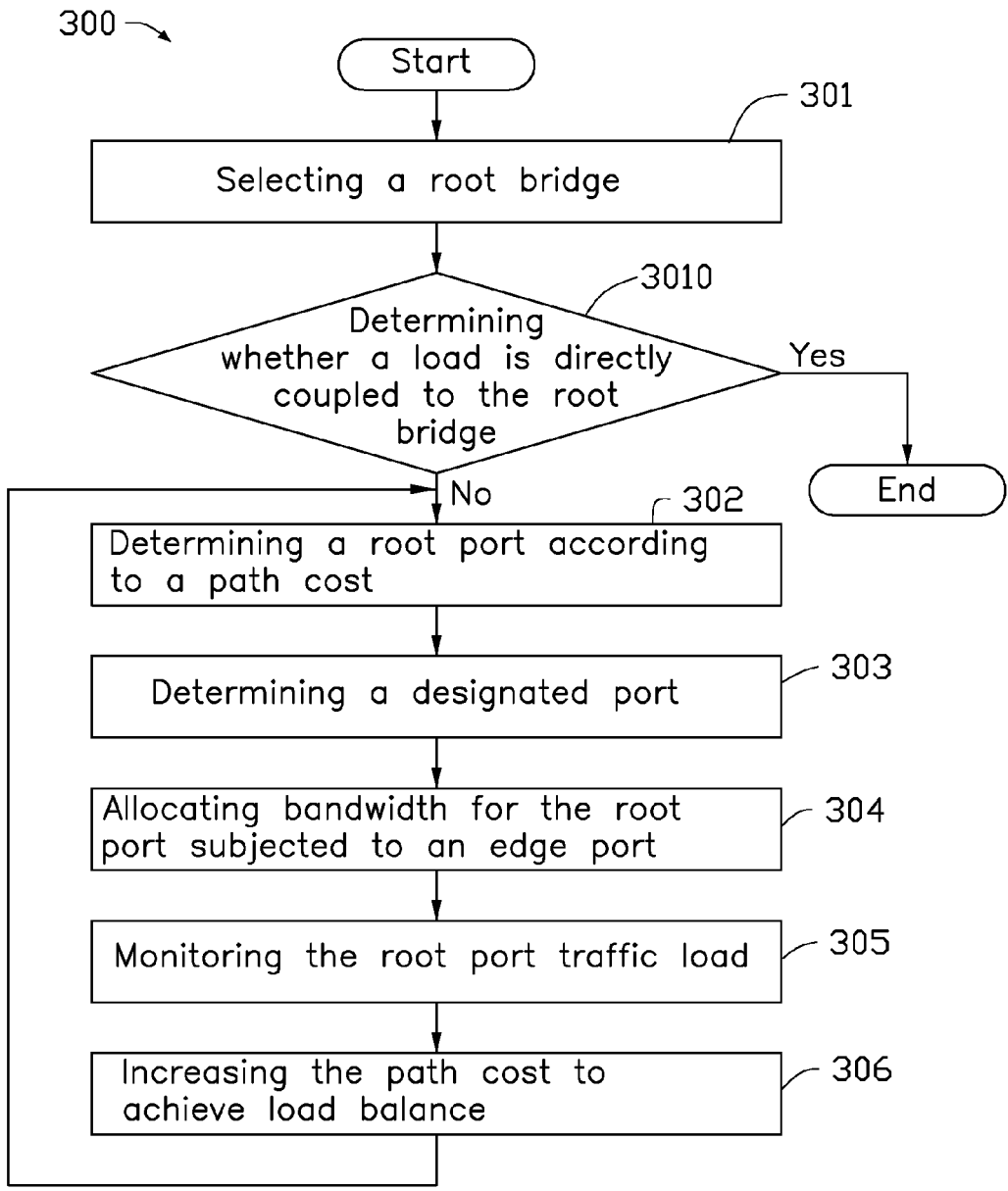
FIG. 2 is a flowchart of an embodiment of a method for the dynamical network load regulating device of the present disclosure.

FIG. 2 illustrates an embodiment of a regulating method 300 for the dynamical network load regulating device 100. The flowchart presents an example embodiment of the method. The example method is provided by way of example, as there are a variety of ways to carry out the method. The method described below can be carried out using the configurations illustrated in FIG. 1, for example, and various elements of these figures are referenced in explaining the example method. Each step shown in FIG. 2 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step S301.

In step S301, a root bridge is selected.

In step S302, a root port is defined according to a path cost.

In step S303, a designated port is defined.

In step S304, bandwidth for the root port subject to an edge port is allocated.

In step S305, a root port traffic load is monitored.

In step S306, a path cost is increased to achieve load balance.

In one embodiment, the regulating method 300 further comprises a step 3010. Step 3010 is between step S301 and step S302. In step 3010, a determination is made as to whether a load is directly coupled to the root bridge. The step S302 further comprises defining the root port according to the path cost in response to the load being indirectly coupled to the root bridge. The step S305 further comprises monitoring the root port traffic load and determining whether or not the root port traffic load is in a state of congestion. The step S306 further comprises increasing a first data transmission path cost to select a second data transmission path to achieve load balance, in response to the root port traffic load being congested.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A dynamic network load regulating device, comprising:
a first network bridge;
a second network bridge, coupled to the first network bridge;
a third network bridge, coupled to the first network bridge and the second network bridge; and
a traffic monitoring module;
wherein the dynamic network load regulating device selects a root bridge, defines a root port according to a path cost and allocates bandwidth for the root port subject to an edge port;
when the first network bridge is selected as the root bridge, the second network bridge and the third network bridge are further coupled to a plurality of terminal devices, each of the network bridges comprises a plurality of ports, the traffic monitoring module is configured to monitor the plurality of ports traffic load; and
when a first data transmission path traffic load reaches a congestion threshold, the dynamic network load regulating device increases the first data transmission path cost to select a second data transmission path to transmit network data.

2. The dynamic network load regulating device of claim 1, wherein the first network bridge comprises a first network bridge first port and a first network bridge second port, the second network bridge comprises a second network bridge first port, a second network bridge second port, a second network bridge third port, and a second network bridge fourth port, and the third network bridge comprises a third network bridge first port, a third network bridge second port, a third network bridge third port, and a third network bridge fourth port; the second network bridge first port is coupled to the first network bridge first port, the second network bridge second port is coupled to a first port device, the second network bridge third port is coupled to a second port device, the third network bridge first port is coupled to the first network bridge second port, the third network bridge second port is coupled to the second network bridge fourth port, the third network bridge third port is coupled to a third port device, and the third network bridge fourth port is coupled to a fourth port device.

3. The dynamic network load regulating device of claim 2, wherein the second network bridge first port and the third network bridge first port are root ports.

4. The dynamic network load regulating device of claim 3, wherein the traffic monitoring module is configured to monitor the root ports traffic load.

5. The dynamic network load regulating device of claim 4, wherein the traffic monitoring module counters and meters the root ports traffic load via a two rate three color marker (TrTCM) algorithm.

6. The dynamic network load regulating device of claim 3, wherein the second network bridge second port, the second network bridge third port, the third network bridge third port, and the third network bridge fourth port are edge ports.

7. The dynamic network load regulating device of claim 6, wherein an edge port committed information rate (CIR) and an edge port peak information rate (PIR) are regulated according to a root port data link rate.

8. The dynamic network load regulating device of claim 1, wherein the data network is a distributed data network.

9. The dynamic network load regulating device of claim 1, wherein the traffic monitoring module is a ternary content addressable memory (TCAM).

10. A method for a dynamic network load regulating device, comprising:

selecting a root bridge;
defining a root port according to a path cost;
defining a designated port;
allocating bandwidth for the root port subject to an edge port;
monitoring a root port traffic load; and
increasing a path cost to achieve load balance.

11. The method of claim 10, wherein the step of monitoring a root port traffic load comprising:
monitoring a root port traffic load; and
determining whether or not the root port traffic load is congested.

12. The method of claim 11, wherein the step of increasing a path cost to achieve load balance comprising:
increasing a first data transmission path cost to select a second data transmission path to achieve load balance in response to the root port traffic load being congested.

13. The method of claim 10, wherein the step of selecting a root bridge comprising:
selecting a root bridge and determining whether or not a load is directly coupled to the root bridge.

14. The method of claim 13, wherein the step of defining a root port according to a path cost comprising:
defining a root port according to a path cost in response to the load being indirectly coupled to the root bridge.

* * * * *